(12) United States Patent
Schmiedel et al.

(10) Patent No.: US 7,897,557 B2
(45) Date of Patent: *Mar. 1, 2011

(54) ENCAPSULATED BLEACHING AGENT PARTICLES

(75) Inventors: Peter Schmiedel, Duesseldorf (DE); Heinz-Juergen Voelkel, Langenfeld (DE); Heribert Kaiser, Duesseldorf (DE); Wolfgang von Rybinski, Duesseldorf (DE); Soeren Hoelsken, Duesseldorf (DE); Volker Blank, Leverkusen (DE); Bernhard Guckenbiehl, Cologne (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 43 days.

This patent is subject to a terminal disclaimer.

(21) Appl. No.: 12/273,722

(22) Filed: Nov. 19, 2008

(65) Prior Publication Data

US 2009/0075856 A1 Mar. 19, 2009

Related U.S. Application Data

(63) Continuation of application No. PCT/EP2007/054528, filed on May 10, 2007.

(30) Foreign Application Priority Data

May 19, 2006 (DE) .................. 10 2006 023 937

(51) Int. Cl.
*C11D 11/00* (2006.01)
*C11D 17/00* (2006.01)
*C11D 7/26* (2006.01)
*C11D 7/54* (2006.01)

(52) U.S. Cl. .................. 510/349; 510/310; 510/375; 510/442; 510/470; 510/473; 252/186.26

(58) Field of Classification Search .................. 510/310, 510/349, 375, 442, 470, 473; 252/186.26
See application file for complete search history.

(56) References Cited

U.S. PATENT DOCUMENTS

| 6,855,681 | B1 | 2/2005 | Ness et al. | |
| 7,638,476 | B2 * | 12/2009 | Orlich et al. | 510/441 |
| 2007/0032396 | A1 | 2/2007 | Schmiedel et al. | |
| 2007/0215184 | A1 | 9/2007 | Jonke et al. | |
| 2007/0256251 | A1 | 11/2007 | Orlich et al. | |
| 2008/0214428 | A1 * | 9/2008 | Orlich et al. | 510/405 |

FOREIGN PATENT DOCUMENTS

| CA | 2 621 471 A1 | 3/2007 |
| EP | 0 436 971 A2 | 7/1991 |
| EP | 0 510 761 A1 | 10/1992 |
| EP | 1 634 944 A1 | 3/2006 |
| GB | 139053 | 2/1920 |
| WO | WO 97/04936 | 2/1997 |
| WO | WO 97/14780 | 4/1997 |
| WO | WO 00/46337 | 8/2000 |
| WO | WO 2006/034758 A1 | 4/2006 |
| WO | WO2007/017070 * | 2/2007 |
| WO | WO 2007/031387 A1 | 3/2007 |

OTHER PUBLICATIONS

MacKenzie, R. C. et al., "Differential Thermal Analysis," *A Review*, vol. 87, 1962, pp. 420-434.
International Search Report of PCT/EP2007/054528, dated Aug. 13, 2007.

* cited by examiner

*Primary Examiner*—Gregory R Del Cotto
(74) *Attorney, Agent, or Firm*—RatnerPrestia

(57) ABSTRACT

A shelf-stable liquid agent or detergent containing a bleaching agent in the form of a finely particulate bleaching agent encapsulated in a crosslinkable polymer matrix.

13 Claims, No Drawings

ENCAPSULATED BLEACHING AGENT PARTICLES

CROSS REFERENCE TO RELATED APPLICATIONS

This application is a continuation under 35 U.S.C. §§120 and 365(c) of International Application PCT/EP2007/054528, filed on May 10, 2007. This application also claims priority under 35 U.S.C. §119 of DE 10 2006 023 937.7 filed on May 19, 2006. The disclosures of PCT/EP2007/054528 and DE 10 2006 023 937.7 are incorporated by reference in their entirety.

BACKGROUND OF THE INVENTION

The present invention relates to particles in capsule form that contain finely particulate bleaching agent in their interior and whose matrix capsule material is a crosslinked polymer, and to methods for their manufacture; and in particular to liquid water-containing laundry detergents and cleaning agents that contain such particles.

In laundry detergents and cleaning agents in liquid form, especially when they contain water but also when they are anhydrous, chemical incompatibility of the individual ingredients can result in negative interactions among said ingredients, and in a decrease in their activity and thus a decrease in the washing performance of the detergent or agent as a whole, even if it is stored for only a relatively short time. This decrease in activity affects, in principle, all laundry-detergent ingredients that perform chemical reactions in the washing process in order to contribute to the washing result, in particular bleaching agents and enzymes, although surfactant or sequestering ingredients that are responsible for dissolution processes or complexing steps also do not have unlimited shelf stability in liquid systems, in particular aqueous systems, especially in the presence of the aforesaid chemically reactive ingredients.

Among the bleaching agents, phthalimidoperoxyalkanoic acids such as, for example, 6-phthalimidoperoxyhexanoic acid (PAP) are known to be highly efficient, but they are particularly unstable chemically in conventional liquid laundry-detergent formulations. In the latter, they usually decompose completely in a few days. Even if possible reaction partners for the peroxycarboxylic acids, such as unsaturated compounds, aldehydes, amines, chloride, etc., are removed from these liquid detergents, they nevertheless decompose in the presence of the surfactants, even when the latter are not oxidatively attacked. The reason for this is possibly that the phthalimidoperoxyalkanoic acids, constituting solids having low water solubility, are stable in that form, but they dissolve in the presence of surfactants, are highly reactive in dissolved form, and decompose both via a bimolecular reaction with the release of singlet oxygen and by hydrolysis yielding phthalimidoalkanoic acid and $H_2O_2$. The latter, however, has practically no bleaching activity especially at low washing temperatures and in the resulting concentrations, with the result that storage causes the bleaching action of the detergent to be lost.

The consumer, however, demands liquid laundry detergents and cleaning agents that have an optimal effect at the time of utilization even after storage and transport. This requires that the ingredients of the liquid laundry detergent and cleaning agent not have previously diminished, decomposed, or volatilized.

The loss of volatile components, for example, can be prevented by way of complex and correspondingly expensive packages. Chemically incompatible components can be stored separately from the remaining components of the liquid laundry detergent and cleaning agent and then metered in for use. The utilization of opaque packaging prevents the decomposition of light-sensitive components, but also has the disadvantage that the consumer cannot see the appearance and quantity of the liquid laundry detergent and cleaning agent.

One concept for the incorporation of sensitive, chemically or physically incompatible, and volatile ingredients consists in the use of capsules in which said ingredients are enclosed. A distinction is made between two types of capsules: on the one hand there are capsules having a core-shell structure, in which the ingredient is surrounded by a wall or barrier. On the other hand there are capsules in which the ingredient is distributed in a matrix made of a matrix-forming material. Such capsules are also referred to as "speckles."

When capsules and other particles are used in laundry detergents, it is also important that they dissolve during the washing operation and leave no residues on the laundry. The same applies analogously to the use thereof in cleaning agents for hard surfaces.

It has occasionally also been proposed to solve the problem of the insufficient stability of bleaching agents, and in particular of peroxycarboxylic acids, by way of a coating. European Patent EP 0 510 761 B1, for example, has described a coated bleaching agent granulate that comprises, as an encasing material, paraffin having a melting point in the range from 40° C. to 50° C., mixed with specific additives selected from ethylene/vinyl acetate copolymers, hydrogenated colophony methyl esters, ethyl acrylate/2-ethylhexyl acrylate copolymers, and mixtures thereof. European Patent Application EP 0 436 971 A2 discloses encased particles that comprise 45 to 65 wt % of a solid bleaching-agent-containing core and 35 to 55 wt % of an encasing layer that contains paraffin wax having a melting point in the range from 40° C. to 50° C. Imidoperoxycarboxylic acids are not listed therein under the bleaching agents. It has been shown, however, that the application of coating materials does not by any means always lead to an increase in the stability specifically of highly active bleaching agents such as, for example, imidoperoxycarboxylic acids.

U.S. Pat. No. 6,855,681 discloses a cleaning-agent composition that encompasses a matrix-encapsulated active ingredient. The matrix of the capsules contains a hydrated anionic gum, and the encapsulated active ingredient is by preference a fragrance.

DESCRIPTION OF THE INVENTION

In summary, the problem still exists of making available a shelf-stable liquid agent that, in addition to a bleaching agent, contains if at all possible all the ingredients, even those incompatible with one another, that are nevertheless necessary for a good washing or cleaning result.

The subject matter of the present invention that intends to make a contribution thereto is a bleaching agent particle obtainable in accordance with the method according to the present invention described in further detail below.

Said particle is a capsule that encompasses finely particulate bleaching agent in a matrix of crosslinked polymer that is obtained by crosslinking crosslinkable water-soluble polymer.

Encapsulation of the bleaching agent allows this compound, which is important for the primary performance of a laundry detergent and cleaning agent, also to be introduced in particular into liquid laundry detergents and cleaning agents without undesirable interactions with other constituents (decomposition, discoloration or loss of color), or other undesirable effects (phase separation, clouding, flocculation, etc.).

A further subject of the invention is a method for manufacturing monodisperse spherical bleaching agent granules by drip-processing an aqueous mixture containing dispersed, finely particulate bleaching agent and water-soluble crosslinkable polymer, and crosslinking the polymer. It is preferred in this context if the aqueous mixture contains 1 wt % to 60 wt %, in particular 5 wt % to 50 wt %, dispersed finely particulate bleaching agent. A "finely particulate" agent is understood in this context as one that has smaller particles than the granules that are to be produced as a result of the method; by preference, the finely particulate bleaching agents are considerably smaller, and their average particle size is less than 10%, in particular less than 2%, of the average particle size of the granules according to the present invention. It is also important that they can be dispersed in water at least briefly, i.e. over the length of the process until crosslinking. If desired, compounds yielding $H_2O_2$ in water can be used, although the use of peroxycarboxylic acids and/or diacyl peroxides is preferred.

Among the peroxycarboxylic acids, imidoperoxycarboxylic acids are particularly preferred. 4-Phthalimidoperoxybutanoic acid, 5-phthalimidoperoxypentanoic acid, 6-phthalimidoperoxyhexanoic acid, 7-phthalimidoperoxyheptanoic acid, N,N'-terephthaloyl di-6-aminoperoxyhexanoic acid, and mixtures thereof are, for example, suitable. The phthalimidoperoxyalkanoic acids, in particular 6-phthalimidoperoxyhexanoic acid (PAP), are among the most-preferred peroxycarboxylic acids.

Diacyl peroxides are compounds of the general formula R'—C(O)—O—O—C(O)—R", in which R' and R" denote organic radicals. An aliphatic diacyl peroxide in which R' and R", mutually independently, each denote an alkyl group having 8 to 20 carbon atoms, is preferred. The diacyl peroxide preferably has a melting point of more than 40° C. Particularly preferred diacyl peroxides are di-n-decanoyl peroxide (R'=R"=n-nonyl), di-n-undecanoyl peroxide (R'=R"=n-decyl), or dilauroyl peroxide (R'=R"=n-undecyl), and mixtures thereof.

The quantity of crosslinkable polymer in the aqueous matrix solution is by preference between 0.01 wt % and 5 wt %, particularly preferably between 0.1 wt % and 2 wt %, and especially preferably between 0.5 wt % and 3 wt %. The crosslinkable polymer is water-soluble, so that the aqueous solutions having at least the aforesaid upper concentration limits can be produced therefrom. The polymer is by preference an ionotropically crosslinkable one. It is selected, in particular, from the group encompassing carrageenan, alginate, and gellan gum, as well as mixtures thereof; and sodium alginate is particularly preferably used as a matrix-forming crosslinkable polymer.

A bleaching agent particle obtainable in accordance with the method according to the present invention has by preference a diameter along the greatest spatial extension of 100 μm to 10,000 μm, in particular 1 mm to 3 mm. The drip-processing method makes it possible to ensure, in simple fashion, that the particle is spherical, i.e. largely round, in particular that its diameter in all other spatial extensions is no more than 15%, in particular no more than 10%, and particularly preferably no more than 5% smaller than its diameter along the greatest physical extension.

It is preferred that the crosslinkable polymer constituting the matrix be selected from a material from the group encompassing carrageenan, alginate, and gellan gum, and mixtures thereof, and particularly preferably is sodium alginate.

Alginate is a naturally occurring salt of alginic acid, and occurs in all brown algae (Phaeophycea) as a cell wall constituent. Alginates are acid, carboxy-group-containing polysaccharides having a relative molecular weight $M_R$ of approximately 200,000, made up of D-mannuronic acid and L-guluronic acid at various ratios, linked with 1,4-glycoside bonds. The sodium, potassium, ammonium, and magnesium alginates are water-soluble. The viscosity of alginate solutions depends, among other factors, on molar weight and on the counterion. Calcium alginates, for example, form thermally irreversible gels at certain quantitative ratios. Sodium alginates yield very viscous solutions with water, and can be crosslinked by interaction with di- or trivalent metal ions such as $Ca^{2+}$. Ingredients that are also contained in the aqueous sodium alginate solution are thus enclosed in an alginate matrix.

Carrageenan is an extract from red algae of the Floridea group (*Chondrus crispus* and *Gigartina stellata*). Carrageenan crosslinks in the presence of $K^+$ ions or $Ca^{2+}$ ions.

Gellan gum is an unbranched anionic microbial heteroexopolysaccharide having a tetrasaccharide basic unit made up of glucose, glucuronic acid, and rhamnose as monomers, approximately every basic unit being esterified with an L-glycerate and every second basic unit with an acetate. Gellan gum crosslinks in the present of $K^+$ ions, $Na^+$ ions, $Ca^{2+}$ ions, or $Mg^{2+}$ ions. Of the materials recited for the matrix, alginate is preferred.

These materials can be crosslinked particularly well with cations to yield crosslinked insoluble gels. By dripping solutions of these materials into cation-containing solutions, it is easy to manufacture substantially spherical capsules that still contain the solution constituents in their interior. If the solution of the crosslinking materials also comprises further constituents—in the present case, bleaching agent dispersed therein—they are surrounded by capsule material after crosslinking and thereby protected. The solvent, in particular water, can be removed at least in part from the capsule interior by drying. Complete removal is normally not necessary and, in particular, not preferred when granules according to the present invention are to be incorporated into a liquid laundry detergent or cleaning agent that already also contains the corresponding solvent, in particular water, since a solvent equilibrium between the capsule interior and the external continuous liquid phase surrounding the capsule is then established more quickly.

The capsules can have any shape within the context of manufacturing conditions, but they are preferably at least approximately spherical. It is also easy to ensure, by drip-processing, that they are monodisperse, i.e. that all the granules are of substantially the same size, since under constant drip conditions identical droplets form from an identical drip-processing liquid. By preference, the size distribution of bleaching agent capsules according to the present invention is so narrow that all the granules have a diameter along the greatest physical extension that deviates no more than 15%, in particular no more than 10%, and particularly preferably no more than 5% from the weighted average of the greatest physical extension of the totality of the bleaching agent capsules.

For aesthetic reasons, it may be desirable for the capsules to be colored. For that purpose, the capsules can contain one or more coloring agents such as a pigment or dye. The latter preferably derives from the aqueous matrix solution that, for that purpose, contains dye, in particular phthalocyanine-based dye.

The capsules can additionally contain hollow microspheres. Hollow microspheres are particles having a diameter from 2 to 500 µm, in particular from 5 to 20 µm, and a specific weight of less than 1 g·cm$^{-3}$. Usefully, the hollow microspheres are round and smooth. The hollow microspheres can be made of inorganic material such as water glass, aluminum silicate, borosilicate glass, soda lime glass, or a ceramic, or of organic polymers such as, for example, homo- or copolymers of styrene, acrylonitrile, and vinylidene chloride. Suitable hollow microspheres are available commercially, for example under the names Fillite® (from Trelleborg Fillite), Expancel® (from Akzo Nobel), Scotchlite® (from 3M), Dualite® (from Sovereign Specialty Chemicals), Sphericel® (from Potters Industries), Zeeospheres® (from 3M), Q-Cel® (from PQ Corporation), or Extendospheres® (from PQ Corporation). Further suitable hollow microspheres are offered by the Omega Minerals company under the product designation E-Spheres. E-Spheres are white ceramic hollow microspheres that are offered in a variety of particle sizes, particle size distributions, bulk weights, and bulk volumes. Many of the aforesaid hollow microspheres are chemically inert and, after destruction of the capsules, are dispersed in the washing liquor and then removed therewith.

The density of the capsules can be varied or adjusted by incorporating hollow microspheres. The quantity of hollow microspheres in a capsule depends on the desired density of the capsule. It is preferred, however, for the quantity of hollow microspheres in the aqueous matrix solution to be by preference between 0 and 10 wt %, more preferably between 1 and 5 wt %, and especially preferably between 2 and 4 wt %.

The capsules can be manufactured, for example, by means of a drip-processing unit of Rieter Automatik GmbH. Drip processing of the aqueous matrix solution that contains the finely particulate bleaching agent to be incorporated is performed by imparting a vibration that is generated with the aid of an oscillating membrane. Droplets are detached as a result of the elevated shear action as the membrane oscillates back. The actual dripping can be performed, for example, through a single nozzle or through a nozzle plate having 10 to 500, by preference 50 to 100 openings. The nozzles by preference comprise openings having a diameter in the range from 0.2 to 2, by preference 0.3 to 0.8 mm. Drip processing can be performed in principle into a precipitation bath that is designed as an agitated container or vessel. The risk exists in this context, however, that capsules may strike and stick to one another. In addition, capsules and the incorporated active ingredient can be destroyed again during agitation, since the agitation process also causes an undesired temperature rise due to the input of energy. These disadvantages can be avoided if the precipitation bath is embodied as a kind of flow conduit. Drip processing is performed into a uniform flow that conveys the droplets out of the drip zone so quickly that they cannot be struck by, and stick to, subsequent droplets. The capsules float as long as they are not completely hardened; as hardening proceeds, they sediment.

Other drip-processing units that differ by having different droplet formation technologies can also be used as alternative manufacturing methods. Examples that may be mentioned here are units made by the Gouda, Cavis, or GeniaLab companies.

It may be advantageous for the capsules subsequently to be washed with water, and then to be washed in an aqueous solution having a complexing agent such as, for example, a phosphonate, in order to wash out free Ca$^{2+}$ ions, which can enter into undesired interactions with ingredients of the liquid laundry detergent and cleaning agent, e.g. the fatty acids. A suitable phosphonate can be, for example, Dequest® of the Solutia company. The capsules can then be washed again with water to remove excess complexing agent. The aqueous bleaching agent dispersion to be transferred into the matrix can likewise contain stabilizers for the bleaching agent, in particular complexing agents.

Capsules thus obtained are used by preference for the manufacture of laundry detergents and cleaning agents, in particular liquid laundry detergents and cleaning agents, and among them in particular water-containing liquid detergents and agents. The bleaching agent capsules can be dried before use in a laundry detergent and cleaning agent. In a particular embodiment of the invention, the bleaching agent granules, in particular if they contain diacyl peroxide, are instead or, preferably, after and/or during the drying operation, encased in a paraffin wax.

Paraffin generally represents a complex substance mixture with no sharp melting point. For characterization, it is usual to determine its melting range by differential thermoanalysis (DTA), as described in "The Analyst" 87 (1962), 420, and/or its solidification point. The latter is understood as the temperature at which the molten material transitions, by slow cooling, from the liquid into the solid state. It is preferable to use waxes that solidify in the range from 20° C. to 70° C. It must be noted in this context that even paraffin wax mixtures that appear solid at room temperature can contain various proportions of liquid paraffin. Particularly preferred paraffin wax mixtures exhibit a liquid proportion of at least 50 wt %, in particular from 55 wt % to 80 wt %, at 40° C., and a liquid proportion of at least 90 wt % at 60° C. It is additionally preferred if the paraffins contain as few volatile components as possible. Preferred paraffin waxes contain less than 1 wt %, in particular less than 0.5 wt %, components that are evaporable at 110° and standard pressure. Paraffin waxes that are particularly usable according to the present invention can be obtained, for example, under the commercial designations Lunaflex® of the Fuller company, and Deawax® of DEA Mineralöl AG. Among the particularly preferred paraffin waxes are those that melt in the range from 40° C. to 65° C., in particular from more than 50° C. to 60° C.

Paraffin is preferably applied onto the capsules in quantities such that the encased particles are made up of 2 wt % to 30 wt %, in particular 5 wt % to 25 wt %, and particularly preferably 7.5 wt % to 20 wt % of the paraffin-wax encasing material. The particle diameters do not, as a rule, change significantly as a result of the encasing, since at the encasing temperatures a portion of the solvent, in particular water, present in the capsule matrix emerges in gas form, and results in a shrinkage of the actual capsule that is compensated for by the paraffin application. For the manufacture of capsules encased according to the present invention, it is preferred to proceed in such a way that a fluidized bed of the capsules to be encased is sprayed with a melt or, if applicable, a preferably aqueous emulsion, dispersion, or slurry of the paraffin; the water (if present) deriving from the emulsion, dispersion, or slurry is removed by evaporation and/or the molten encasing material is solidified by cooling; and the encased capsules are discharged from the fluidized bed in a manner that is usual in principle. What is preferred in the context of encasing according to the present invention with paraffin wax is a melt-coating operation in which the paraffin is heated to a temperature that is 5° C. to 40° C. above its melting point, and is applied onto capsules that have a temperature below the paraffin solidification point. They are by preference cooled by the fluidizing medium, which then has a correspondingly low temperature, so that the paraffin wax solidifies onto the capsules.

Release of the bleaching agent from the capsules is usually accomplished, during use of the detergent or agent containing them, by destruction of the matrix as a result of a mechanical, thermal, chemical, and/or enzymatic action. If desired, the aqueous matrix dispersion used to manufacture the capsules can additionally contain disintegration adjuvants in order to achieve faster release. In a preferred embodiment of the invention, the laundry detergents or cleaning agents contain identical or different capsules in quantities from 0.01 to 10 wt %, in particular 0.2 to 8 wt %, and extremely preferably 0.5 to 5 wt %. It is particularly preferred to use capsules according to the present invention in liquid, especially water-containing detergents or agents, but if desired they can also be incorporated into particulate laundry detergents or cleaning agents.

A further subject of the invention is an aqueous liquid laundry detergent or cleaning agent containing surfactant and monodisperse spherical bleaching agent granules that are obtainable in accordance with the method according to the present invention.

In addition to the capsules optionally encased with paraffin, the laundry detergents or cleaning agents contain surfactant(s); anionic, nonionic, cationic, and/or amphoteric surfactants can be used. Mixtures of anionic and nonionic surfactants are preferred from an applications-engineering standpoint. The total surfactant content of the liquid laundry detergent and cleaning agent is by preference below 40 wt % and particularly preferably below 35 wt %, based on the entire liquid laundry detergent and cleaning agent. The latter contains by preference at least one additional active ingredient that is not a constituent of the granules, selected from the group encompassing optical brighteners, complexing agents, bleach activators, dyes, fragrances, antioxidants, detergency builders, enzymes, enzyme stabilizers, antimicrobial active substances, graying inhibitors, anti-redeposition agents, pH adjusting agents, soil-release polymers, color transfer inhibitors, electrolytes, conditioning oils, slip agents, skin-care agents, foam inhibitors, vitamins, proteins, preservatives, washing-power intensifiers, luster agents, and UV absorbers, and mixtures thereof.

The nonionic surfactants used are preferably alkoxylated, advantageously ethoxylated, in particular primary alcohols having by preference 8 to 18 carbon atoms and an average of 1 to 12 mol ethylene oxide (EO) per mol of alcohol, in which the alcohol radical can be linear or preferably methyl-branched in the 2-position, or can contain mixed linear and methyl-branched radicals, such as those that are usually present in oxo alcohol radicals. Particularly preferred, however, are alcohol ethoxylates having linear radicals made up of alcohols of natural origin having 12 to 18 carbon atoms, e.g. from coconut, palm, tallow, or oleyl alcohol, and an average of 2 to 8 EO per mol of alcohol. The preferred ethoxylated alcohols include, for example, $C_{12-14}$ alcohols having 3 EO or 4 EO, $C_{9-11}$ alcohol having 7 EO, $C_{13-15}$ alcohols having 3 EO, 5 EO, 7 EO, or 8 EO, $C_{12-18}$ alcohols having 3 EO, 5 EO, or 7 EO, and mixtures thereof, such as mixtures of $C_{12-14}$ alcohol having 3 EO and $C_{12-18}$ alcohol having 5 EO. The degrees of ethoxylation indicated represent statistical averages, which can correspond to an integer or a fraction for a specific product. Preferred alcohol ethoxylates exhibit a restricted distribution of homologs (narrow range ethoxylates, NRE). In addition to these nonionic surfactants, fatty alcohols having more than 12 EO can also be used. Examples of these are tallow fatty alcohol having 14 EO, 25 EO, 30 EO, or 40 EO. Nonionic surfactants that contain EO and PO groups together in the molecule are also usable according to the present invention. Block copolymers having EO-PO block units or PO-EO block units, but also EO-PO-EO copolymers or PO-EO-PO copolymers, can be used in this context. Also usable, of course, are mixed alkoxylated nonionic surfactants in which EO and PO units are distributed statistically rather than in block fashion. Such products are obtainable by the simultaneous action of ethylene oxide and propylene oxide on fatty alcohols.

Also usable as further nonionic surfactants are alkyl glycosides of the general formula $RO(G)_x$, in which R denotes a primary straight-chain or methyl-branched (in particular methyl-branched in the 2-position) aliphatic radical having 8 to 22, by preference 12 to 18 carbon atoms; and G is the symbol denoting a glycose unit having 5 or 6 carbon atoms, preferably glucose. The degree of oligomerization x, which indicates the distribution of monoglycosides and oligoglycosides, is any number between 1 and 10; by preference, x is between 1.2 and 1.4.

A further class of nonionic surfactants used in preferred fashion, which are used either as the only nonionic surfactant or in combination with other nonionic surfactants, are alkoxylated, preferably ethoxylated or ethoxylated and propoxylated, fatty acid alkyl esters, by preference having 1 to 4 carbon atoms in the alkyl chain, in particular fatty acid methyl esters.

Nonionic surfactants of the amine oxide type, for example N-cocalkyl-N,N-dimethylamine oxide and N-tallowalkyl-N,N-dihydroxyethylamine oxide, and the fatty acid alkanolamides, can also be suitable. The quantity of these nonionic surfactants is by preference no more than that of the ethoxylated fatty alcohols, in particular no more than half thereof.

Further suitable surfactants are polyhydroxy fatty acid amides of formula (2)

(2)

in which RCO denotes an aliphatic acyl radical having 6 to 22 carbon atoms; $R^1$ denotes hydrogen, an alkyl or hydroxyalkyl radical having 1 to 4 carbon atoms; and [Z] denotes a linear or branched polyhydroxyalkyl radical having 3 to 10 carbon atoms and 3 to 10 hydroxyl groups. The polyhydroxy fatty acid amides are known substances that can usually be obtained by reductive amination of a reducing sugar with ammonia, an alkylamine, or an alkanolamine, and subsequent acylation with a fatty acid, a fatty acid alkyl ester, or a fatty acid chloride.

Also belonging to the group of the polyhydroxy fatty acid amides are compounds of formula (3)

(3)

in which R denotes a linear or branched alkyl or alkenyl radical having 7 to 12 carbon atoms; $R^1$ denotes a linear, branched, or cyclic alkyl radical or an aryl radical having 2 to 8 carbon atoms; and $R^2$ denotes a linear, branched, or cyclic alkyl radical or an aryl radical or an oxyalkyl radical having 1 to 8 carbon atoms, $C_{1-4}$ alkyl or phenyl radicals being preferred; and [Z] denotes a linear polyhydroxyalkyl radical whose alkyl chain is substituted with at least two hydroxyl groups, or alkoxylated, preferably ethoxylated or propoxylated, derivatives of that radical.

[Z] is preferably obtained by reductive amination of a sugar, for example glucose, fructose, maltose, lactose, galactose, mannose, or xylose. The N-alkoxy- or N-aryloxy-substituted compounds can then be converted into the desired polyhydroxy fatty acid amides by reaction with fatty acid methyl esters in the presence of an alkoxide as catalyst.

The concentration of nonionic surfactants in the liquid laundry detergents and cleaning agents is preferably 5 to 30 wt %, by preference 7 to 20 wt %, and in particular 9 to 15 wt %, based in each case on the entire agent.

Anionic surfactants that can be used are, for example, those of the sulfonate and sulfate types. Possibilities as surfactants of the sulfonate type are, by preference, $C_{9-13}$ alkylbenzenesulfonates, olefinsulfonates, i.e. mixtures of alkene- and hydroxyalkanesulfonates, and disulfonates, for example such as those obtained from $C_{12-18}$ monoolefins having an end-located or internal double bond, by sulfonation with gaseous sulfur trioxide and subsequent alkaline or acid hydrolysis of the sulfonation products. Also suitable are alkanesulfonates that are obtained from $C_{12-18}$ alkanes, for example by sulfochlorination or sulfoxidation with subsequent hydrolysis and neutralization. The esters of $\alpha$-sulfo fatty acids (estersulfonates), e.g. the $\alpha$-sulfonated methyl esters of hydrogenated coconut, palm kernel, or tallow fatty acids, are likewise suitable.

Further suitable anionic surfactants are sulfonated fatty acid glycerol esters. "Fatty acid glycerol esters" are to be understood as the mono-, di- and triesters, and mixtures thereof, that are obtained during the production by esterification of a monoglycerol with 1 to 3 mol fatty acid, or upon transesterification of triglycerides with 0.3 to 2 mol glycerol. Preferred sulfonated fatty acid glycerol esters are the sulfonation products of saturated fatty acids having 6 to 22 carbon atoms, for example hexanoic acid, octanoic acid, decanoic acid, myristic acid, lauric acid, palmitic acid, stearic acid, or behenic acid.

Preferred alk(en)yl sulfates are the alkali, and in particular sodium, salts of the sulfuric acid semi-esters of the $C_{12}$-$C_{18}$ fatty alcohols, for example from coconut fatty alcohol, tallow fatty alcohol, lauryl, myristyl, cetyl, or stearyl alcohol, or the $C_{10}$-$C_{20}$ oxo alcohols, and those semi-esters of secondary alcohols of those chain lengths. Additionally preferred are alk(en)yl sulfates of the aforesaid chain length that contain a synthetic straight-chain alkyl radical produced on a petrochemical basis, which possess a breakdown behavior analogous to those appropriate compounds based on fat-chemistry raw materials. For purposes of washing technology, the $C_{12}$-$C_{16}$ alkyl sulfates and $C_{12}$-$C_{15}$ alkyl sulfates, as well as $C_{14}$-$C_{15}$ alkyl sulfates, are preferred. 2,3-Alkyl sulfates that can be obtained, for example, as commercial products of the Shell Oil Company under the name DAN®, are also suitable anionic surfactants.

The sulfuric acid monoesters of straight-chain or branched $C_{7-21}$ alcohols ethoxylated with 1 to 6 mol ethylene oxide, such as 2-methyl-branched $C_{9-11}$ alcohols having an average of 3.5 mol ethylene oxide (EO) or $C_{12-18}$ fatty alcohols having 1 to 4 EO, are also suitable. Because of their high foaming characteristics they are used in cleaning agents only in relatively small quantities, for example in quantities from 1 to 5 wt %.

Other suitable anionic surfactants are also the salts of alkylsulfosuccinic acid, which are also referred to as sulfosuccinates or as sulfosuccinic acid esters and represent the monoesters and/or diesters of sulfosuccinic acid with alcohols, preferably fatty alcohols, and in particular ethoxylated fatty alcohols. Preferred sulfosuccinates contain $C_{8-18}$ fatty alcohol radicals or mixtures thereof. Particularly preferred sulfosuccinates contain a fatty alcohol radical that is derived from ethoxylated fatty alcohols that, considered per se, represent nonionic surfactants (see below for description). Sulfosuccinates whose fatty alcohol radicals derive from ethoxylated fatty alcohols having a restricted homolog distribution are, in turn, particularly preferred. It is likewise also possible to use alk(en)ylsuccinic acid having by preference 8 to 18 carbon atoms in the alk(en)yl chain, or salts thereof.

Soaps are particularly preferred anionic surfactants. Saturated and unsaturated fatty acid soaps, such as the salts of lauric acid, myristic acid, palmitic acid, stearic acid, hydrogenated erucic acid, and behenic acid, are suitable, as are soap mixtures derived in particular from natural fatty acids, e.g. coconut, palm-kernel, olive-oil, or tallow fatty acids.

The anionic surfactants, including the soaps, can be present in the form of their sodium, potassium, or ammonium salts, and as soluble salts of organic bases, such as mono-, di-, or triethanolamine. The anionic surfactants are preferably present in the form of their sodium or potassium salts, in particular in the form of the sodium salts.

The concentration of anionic surfactants in preferred liquid laundry detergents and cleaning agents is 2 to 30 wt %, by preference 4 to 25 wt %, and in particular 5 to 22 wt %, based in each case on the entire agent.

The viscosity of the liquid laundry detergent or cleaning agent can be measured with usual standard methods (e.g. Brookfield LVT-II viscosimeter at 20 rpm und 20° C., spindle 3), and is by preference in the range from 500 to 5000 mPas. Preferred detergents or agents have viscosities from 700 to 400 mPas, values between 1000 and 3000 mPas being particularly preferred.

In addition to the capsules and the surfactant(s), the laundry detergents or cleaning agents can contain further ingredients that further improve the applications-engineering and/or aesthetic properties of the liquid laundry detergent and cleaning agent. In the context of the present invention, preferred detergents and agents contain, in addition to the capsules and the surfactant(s), one or more substances from the group of the detergency builders, bleach activators, enzymes, electrolytes, nonaqueous solvents, pH adjusting agents, fragrances, perfume carriers, fluorescing agents, dyes, hydrotropes, foam inhibitors, silicone oils, anti-redeposition agents, optical brighteners, graying inhibitors, shrinkage preventers, wrinkle protection agents, color transfer inhibitors, antimicrobial active substances, germicides, fungicides, antioxidants, corrosion inhibitors, antistatic agents, ironing adjuvants, proofing and impregnating agents, swelling and anti-slip agents, and UV absorbers. If the capsules that are essential to the invention contain a highly active oxidizing agent such as PAP, the presence of bleach activator and antimicrobial active substance, and of a germicide and fungicide, can be dispensed with.

Silicates, aluminum silicates (in particular zeolites), carbonates, salts of organic di- and polycarboxylic acids, and mixtures of these substances, may be mentioned in particular as detergency builders that can be contained in the liquid laundry detergents and cleaning agents.

Suitable crystalline, sheet-form sodium silicates possess the general formula $NaMSi_xO_{2x+1}.H_2O$, where M denotes sodium or hydrogen, x is a number from 1.9 to 4, and y is a number from 0 to 20, and preferred values for x are 2, 3, or 4. Preferred crystalline sheet silicates of the formula indicated above are those in which M denotes sodium and x assumes the value 2 or 3. Both β- and δ-sodium disilicates $Na_2Si_2O_5.yH_2O$ are particularly preferred.

Also usable are amorphous sodium silicates having a $Na_2O:SiO_2$ modulus from 1:2 to 1:3.3, preferably 1:2 to 1:2.8, and in particular 1:2 to 1:2.6, which are dissolution-delayed and exhibit secondary washing properties. The dissolution delay as compared with conventional amorphous sodium silicates can have been brought about in various ways, for example by surface treatment, compounding, compacting/densification, or overdrying. In the context of this invention, the term "amorphous" is also understood to mean "X-amorphous." In other words, in X-ray diffraction experiments the silicates yield not the sharp X-ray reflections that are typical of crystalline substances, but at most one or more maxima in the scattered X radiation that have a width of several degree units of the diffraction angle. Particularly good builder properties can, however, very easily be obtained even if the silicate particles yield blurred or even sharp diffraction maxima in electron beam diffraction experiments. This may be interpreted to mean that the products comprise microcrystalline regions 10 to several hundred nm in size, values of up to a maximum of 50 nm, and in particular a maximum of 20 nm, being preferred. So-called X-amorphous silicates of this kind likewise exhibit a dissolution delay as compared with conventional water glasses. Densified/compacted amorphous silicates, compounded amorphous silicates, and overdried X-amorphous silicates are particularly preferred.

The finely crystalline synthetic zeolite containing bound water that is used is by preference zeolite A and/or zeolite P. Zeolite MAP® (commercial product of the Crosfield Co.) is particularly preferred as zeolite P. Also suitable, however, are zeolite X as well as mixtures of A, X, and/or P. Also commercially available and preferably usable in the context of the present invention is, for example, a co-crystal of zeolite X and zeolite A (approx. 80 wt % zeolite X) that is marketed by the Sasol company under the trade name VEGOBOND AX® and can be described by the formula

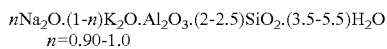

$$n\text{Na}_2\text{O}.(1-n)\text{K}_2\text{O}.\text{Al}_2\text{O}_3.(2\text{-}2.5)\text{SiO}_2.(3.5\text{-}5.5)\text{H}_2\text{O}$$
$$n=0.90\text{-}1.0$$

The zeolite can be used as a spray-dried powder or also as an undried stabilized suspension still moist as manufactured. In the event the zeolite is used as a suspension, it can contain small additions of nonionic surfactants as stabilizers, for example 1 to 3 wt %, based on the zeolite, of ethoxylated $C_{12}$-$C_{18}$ fatty alcohols having 2 to 5 ethylene oxide groups, $C_{12}$-$C_{14}$ fatty alcohols having 4 to 5 ethylene oxide groups, or ethoxylated isotridecanols. Suitable zeolites exhibit an average particle size of less than 10 μm (volume distribution; measurement method: Coulter Counter), and preferably contain 18 to 22 wt %, in particular 20 to 22 wt %, bound water.

The use of the generally known phosphates as builder substances is also possible, of course, provided such use should not be avoided for environmental reasons. The sodium salts of the orthophosphates, of the pyrophosphates, and in particular of the tripolyphosphates are particularly suitable.

Bleach activators can be incorporated into the laundry detergents and cleaning agents in order to achieve an improved bleaching effect, when washing at temperatures of 60° C. and below, for compounds yielding $H_2O_2$ in water. Compounds that, under perhydrolysis conditions, yield aliphatic peroxycarboxylic acids having preferably 1 to 10 carbon atoms, in particular 2 to 4 carbon atoms, and/or optionally substituted perbenzoic acid, can be used as bleach activators. Substances that carry O- and/or N-acyl groups having the aforesaid number of carbon atoms, and/or that carry optionally substituted benzoyl groups, are suitable. Multiply acylated alkylenediamines, in particular tetraacetyl ethylenediamine (TAED), acylated triazine derivatives, in particular 1,5-diacetyl-2,4-dioxohexahydro-1,3,5-triazine (DADHT), acylated glycolurils, in particular tetraacetyl glycoluril (TAGU), N-acylimides, in particular N-nonanoyl succinimide (NOSI), acylated phenolsulfonates, in particular n-nonanoyl or isononanoyl oxybenzenesulfonate (n- or iso-NOBS), carboxylic acid anhydrides, in particular phthalic acid anhydride, acylated polyvalent alcohols, in particular triacetin, ethylene glycol diacetate, and 2,5-diacetoxy-2,5-dihydrofuran, are preferred.

In addition to or instead of the conventional bleach activators, so-called bleach catalysts can also be incorporated into the liquid laundry detergents and cleaning agents. These substances are bleach-intensifying transition-metal salts or transition-metal complexes such as, for example, Mn, Fe, Co, Ru, or Mo salt complexes or carbonyl complexes. Mn, Fe, Co, Ru, Mo, Ti, V, and Cu complexes having nitrogen-containing tripod ligands, as well as Co, Fe, Cu, and Ru ammine complexes, are also applicable as bleach catalysts.

A liquid laundry detergent or cleaning agent according to the present invention preferably contains a thickener. The thickening agent can encompass, for example, a polyacrylate thickener, xanthan gum, gellan gum, guar flour, alginate, carrageenan, carboxymethyl cellulose, bentonite, wellan gum, locust bean flour, agar-agar, tragacanth, gum arabic, pectins, polyoses, starch, dextrines, gelatins, and casein. Modified natural substances such as modified starches and celluloses can, however, also be used as thickening agents; examples that may be cited here are carboxymethyl cellulose and other cellulose ethers, hydroxyethyl and -propyl cellulose, and seed flour ethers.

Included among the polyacrylate and polymethacrylate thickeners are, for example, the high-molecular-weight homopolymers of acrylic acid crosslinked with a polyalkenyl polyether, in particular an allyl ether, of sucrose, pentaerythritol, or propylene (INCI name, according to "International Dictionary of Cosmetic Ingredients" of the Cosmetic, Toiletry and Fragrance Association (CFTA): Carbomer), which are also referred to as carboxyvinyl polymers. Polyacrylic acids of this kind are obtained from, among other sources, the 3V Sigma company under the trade name Polygel®, e.g. Polygel DA, and from the B.F. Goodrich company under the trade name Carbopol®, e.g. Carbopol 940 (molecular weight approx. 4,000,000), Carbopol 941 (molecular weight approx. 1,250,000), or Carbopol 934 (molecular weight approx. 3,000,000). Also included thereamong are the following acrylic acid copolymers: (i) copolymers of two or more monomers from the group of acrylic acid, methacrylic acid, and their simple esters, formed by preference with $C_{1\text{-}4}$ alkanols (INCI: Acrylates Copolymer), included among which are, for example, the copolymers of methacrylic acid, butyl acrylate, and methyl methacrylate (CAS designation according to Chemical Abstracts Service: 25035-69-2), or of butyl acrylate and methyl methacrylate (CAS 25852-37-3), and which are obtainable, for example, from the Rohm & Haas company under the trade names Aculyn® and Acusol®, and from the Degussa (Goldschmidt) company under the trade name Tego® Polymer, e.g. the anionic nonassociative polymers Aculyn 22, Aculyn 28, Aculyn 33 (crosslinked), Acusol 810, Acusol 820, Acusol 823, and Acusol 830 (CAS 25852-37-3); (ii) crosslinked high-molecular-weight acrylic acid copolymers, included among which are, for example, the copolymers, crosslinked with an allyl ether of sucrose or of pentaerythritol, of $C_{10\text{-}30}$ alkyl acrylates with one or more monomers from the group of acrylic acid, methacrylic acid, and their simple esters formed preferably with $C_{1\text{-}4}$ alkanols (INCI: Acrylates/$C_{10\text{-}30}$ Alkyl Acrylate Crosspolymer), and which are obtainable, for example, from the B.F. Goodrich company under the trade name Carbopol®, e.g. the hydrophobized Carbopol ETD 2623 and Carbopol 1382 (INCI: Acrylates/$C_{10\text{-}30}$ Alkyl Acrylate Crosspolymer), and Carbopol Aqua 30 (formerly Carbopol EX 473).

A further polymeric thickening agent preferred for use is xanthan gum, a microbial anionic heteropolysaccharide that is produced by *Xanthomonas campestris* and several other species under aerobic conditions, and has a molecular weight from 2 to 15 million dalton. Xanthan is made up of a chain having β-1,4-bound glucose (cellulose) with side chains. The structure of the subgroups is made up of glucose, mannose, glucuronic acid, acetate, and pyruvate; the number of pyruvate units determines the viscosity of the xanthan gum.

Xanthan gum can be described by formula (1) below:

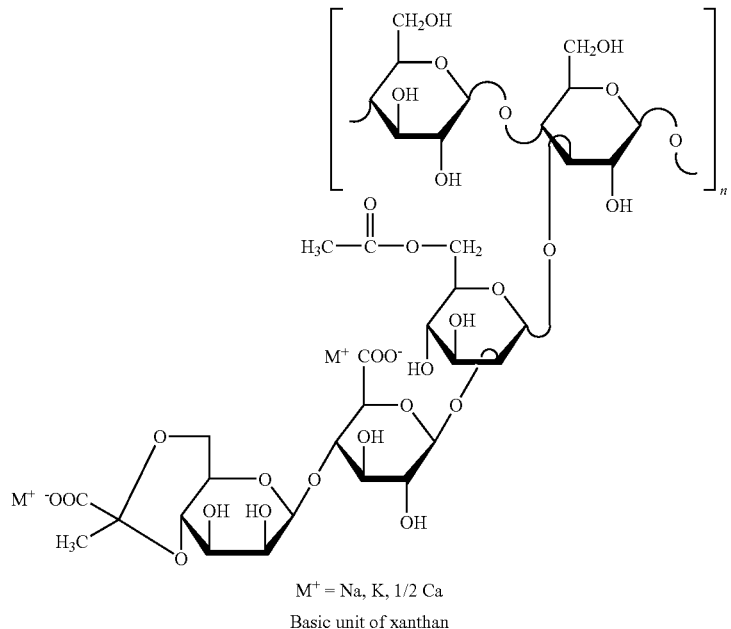

$M^+$ = Na, K, 1/2 Ca

Basic unit of xanthan

Xanthan gum is obtainable, for example, from the Kelco company under the trade names Keltrol® and Kelzan®, or also from the Rhodia company under the trade name Rhodopol®.

Preferred aqueous liquid laundry detergents and cleaning agents contain, based on the entire detergent or agent, 0.01 to 3 wt %, and by preference 0.1 to 1 wt %, thickening agent. The quantity of thickening agent used depends on the type of thickening agent and the desired degree of thickening.

The aqueous liquid laundry detergents or cleaning agents can contain enzymes, optionally in encapsulated form. Suitable enzymes are, in particular, those in the classes of hydrolases, such as proteases, esterases, lipases or lipolytically active enzymes, amylases, cellulases and other glycosyl hydrolases, and mixtures of the aforesaid enzymes. All these hydrolases contribute, in the laundry, to the removal of stains such as protein-, grease-, or starch-containing stains, and graying. Cellulases and other glycosyl hydrolases can moreover contribute to color retention and to enhanced textile softness by removing pilling and microfibrils. Oxidoreductases can also be used for bleaching and to inhibit color transfer. Enzymatic active substances obtained from bacterial strains or fungi, such as *Bacillus subtilis, Bacillus licheniformis, Streptomyceus griseus*, and *Humicola insolens*, are particularly suitable. Proteases of the subtilisin type, and in particular proteases obtained from *Bacillus lentus*, are preferably used. Enzyme mixtures, for example of protease and amylase or protease and lipase or lipolytically active enzymes, or protease and cellulase, or of cellulase and lipase or lipolytically active enzymes, or of protease, amylase, and lipase or lipolytically active enzymes, or protease, lipase or lipolytically active enzymes, and cellulase, but in particular protease- and/or lipase-containing mixtures or mixtures with lipolytically active enzymes, are of particular interest in this context. Examples of such lipolytically active enzymes are the known cutinases. Peroxidases or oxidases have also proven suitable in certain cases. The suitable amylases include, in particular, α-amylases, isoamylases, pullulanases, and pectinases. Cellobiohydrolases, endoglucanases, and β-glucosidases, which are also called cellobiases, and mixtures thereof, are preferably used as cellulases. Because different types of cellulase differ in terms of their CMCase and avicelase activities, the desired activities can be adjusted by means of controlled mixtures of the cellulases.

The enzymes can be adsorbed onto carrier materials in order to protect them from premature breakdown. The proportion of enzymes, enzyme mixtures, or enzyme granulates in the laundry-detergent or washing-agent composition can be, for example, approximately 0.1 to 5 wt %, by preference 0.12 to approximately 2.5 wt %.

A large number of very varied salts from the group of the inorganic salts can be used as electrolytes. Preferred cations are the alkali and alkaline-earth metals; preferred anions are the phosphates and sulfates. From a production-engineering standpoint, the use of $Na_2SO_4$ or $MgSO_4$ in the detergents or agents is preferred. The proportion of electrolytes in the detergents or agents is usually 0.5 to 5 wt %.

Nonaqueous solvents that can be used in the liquid laundry detergents and cleaning agents derive, for example, from the group of the monovalent or polyvalent alcohols, alkanolamines, or glycol ethers, provided they are miscible with water in the indicated concentration range. The solvents are by preference selected from ethanol, n- or isopropanol, butanols, glycol, propane- or butanediol, glycerol, diglycol, propyl or butyl diglycol, hexylene glycol, ethylene glycol methyl ether, ethylene glycol ethyl ether, ethylene glycol propyl ether, etheylene glycol mono-n-butyl ether, diethylene glycol methyl ether, diethylene glycol ethyl ether, propylene glycol methyl, ethyl, or propyl ether, dipropylene glycol monomethyl or -ethyl ether, diisopropylene glycol monomethyl or -ethyl ether, methoxy-, ethoxy-, or butoxytriglycol, 1-butoxy-ethoxy-2-propanol, 3-methyl-3-methoxybutanol, propylene glycol t-butyl ether, and mixtures of these solvents. Nonaqueous solvents can be used in the liquid laundry detergents and cleaning agents in quantities between 0.5 and 15 wt %, but preferably below 12 wt % and in particular below 9 wt %.

In order to bring the pH of the liquid laundry detergents and cleaning agents into the desired range, the use of pH adjusting agents may be indicated. All known acids and bases are usable here, provided their use is not prohibited for environmental or applications-engineering reasons, or for reasons of consumer safety. The quantity of these adjusting agents usually does not exceed 7 wt % of the entire formulation. Liquid detergents or agents according to the present invention by preference exhibit an acid pH of, in particular, pH 3.5 to pH 6.5. If desired, their liquid phase can also be neutral to weakly alkaline, e.g. up to pH 9.5. Water can be contained in detergents or agents according to the present invention, if desired, in quantities of up to 90 wt %, in particular 20 wt % to 75 wt %; if applicable, however, quantities can also exceed or fall below these ranges.

In order to improve the aesthetic impression of the liquid laundry detergents or cleaning agents, they can be colored with suitable dyes. Preferred dyes, the selection of which will present no difficulty whatsoever to one skilled in the art, possess excellent shelf stability and insensitivity to the other ingredients of the detergents or agents and to light, and no pronounced substantivity with respect to textile fibers, in order not to color them. If the capsules according to the present invention are colored, the liquid phase of the detergent or agent preferably exhibits a different color or a different color shade.

Suitable foam inhibitors that can be used in the liquid laundry detergents and cleaning agents are, for example, soaps, paraffins, or silicone oils, which if applicable can be applied onto carrier materials.

Suitable soil-release polymers (which are also referred to as "anti-redeposition agents") are, for example, nonionic cellulose ethers such as methyl cellulose and methylhydroxypropyl cellulose having a 15 to 30 wt % concentration of methoxy groups and a 1 to 15 wt % concentration of hydroxypropyl groups, based in each case on the nonionic cellulose ethers, as well as the polymers, known from the existing art, of phthalic acid and/or terephthalic acid or their derivatives, in particular polymers of ethylene terephthalates and/or polyethylene and/or polypropylene glycol terephthalates or anionically and/or nonionically modified derivatives thereof. Suitable derivatives encompass the sulfonated derivatives of the phthalic acid and terephthalic acid polymers.

Optical brighteners (so-called "whiteners") can be added to the liquid laundry detergents and cleaning agents in order to eliminate graying and yellowing of the treated textile fabrics. These substances are absorbed onto the fibers and cause a brightening and simulated bleaching effect by converting invisible ultraviolet radiation into visible longer-wave light; the ultraviolet light absorbed from sunlight is radiated as a faintly bluish fluorescence, combining with the yellow tint of the grayed or yellowed laundry to yield pure white. Suitable compounds derive, for example, from the substance classes of the 4,4'-diamino-2,2'-stilbenedisulfonic acids (flavonic acids), 4,4'-distyrylbiphenylene, methylumbelliferones, cumarins, dihydroquinolinones, 1,3-diarylpyrazolines, naphthalic acid imides, benzoxazole, benzisoxazole, and benzimidazole systems, and the pyrene derivatives substituted with heterocycles. The optical brighteners are usually used in quantities between 0.03 and 0.3 wt %, based on the complete detergent or agent.

The purpose of graying inhibitors is to keep dirt released from the fibers suspended in the bath, thus preventing the dirt from redepositing. Water-soluble colloids, usually organic in nature, are suitable for this, for example size, gelatin, salts of ethersulfonic acids of starch or of cellulose, or salts of acid sulfuric acid esters of cellulose or starch. Water-soluble polyamides containing acid groups are also suitable for this purpose. Soluble starch preparations, and starch products other than those mentioned above, can also be used, e.g. degraded starch, aldehyde starches, etc. Polyvinylpyrrolidone is also usable. It is preferred, however, to use cellulose ethers such as carboxymethyl cellulose (Na salt), methyl cellulose, hydroxyalkyl cellulose, and mixed ethers such as methylhydroxyethyl cellulose, methylhydroxypropyl cellulose, methylcarboxymethyl cellulose, and mixtures thereof, in quantities from 0.1 to 5 wt % based on the agents.

Because textile fabrics, in particular those made of rayon, viscose, cotton, and mixtures thereof, can tend to wrinkle because the individual fibers are sensitive to bending, kinking, compression, and squeezing perpendicularly to the fiber direction, the detergents or agents can contain synthetic wrinkle-prevention agents. These include, for example, synthetic products based on fatty acids, fatty acid esters, fatty acid amides, fatty acid alkylol esters, fatty acid alkylolamides, or fatty alcohols that are usually reacted with ethylene oxide, or products based on lecithin or modified phosphoric acid esters.

In order to counteract microorganisms, the liquid laundry detergents and cleaning agents can contain antimicrobial active substances. A distinction is made here, depending on the antimicrobial spectrum and mechanism of action, between bacteriostatics and bactericides, fungistatics and fungicides, etc. Important substances from these groups are, for example, benzalkonium chlorides, alkylarylsulfonates, halogen phenols, and phenol mercuric acetate; these compounds can also be entirely dispensed with in the detergents or agents according to the present invention.

In order to prevent undesirable changes to the liquid laundry detergents and cleaning agents and/or to the treated textile fabrics caused by the action of oxygen and other oxidative processes, the detergents or agents can contain antioxidants in the liquid phase. This class of compounds includes, for example, substituted phenols, hydroquinones, catechols, and aromatic amines, as well as organic sulfides, polysulfides, dithiocarbamates, phosphites, and phosphonates.

Increased wearing comfort can result from the additional use of antistatic agents that are additionally added to the detergents or agents. Antistatic agents increase the surface conductivity and thus make possible improved dissipation of charges that have formed. External antistatic agents are usually substances having at least one hydrophilic molecule ligand, and yield a more or less hygroscopic film on the surfaces. These usually surface-active antistatic agents can be subdivided into nitrogen-containing (amines, amides, quaternary ammonium compounds), phosphorus-containing (phosphoric acid esters), and sulfur-containing antistatic agents (alkylsulfonates, alkyl sulfates). Lauryl- (or stearyl)-dimethylbenzylammonium chlorides are suitable as antistatic agents for textiles or as an additive to washing agents, an avivage effect additionally being achieved.

In order to improve the water absorption capability and rewettability of the treated textile fabrics and to facilitate ironing of the treated textile fabrics, silicone derivatives, for example, can be used in the liquid laundry detergents and cleaning agents. These additionally improve the rinsing behavior of the detergents or agents thanks to their foam-inhibiting properties. Preferred silicone derivatives are, for example, polydialkyl- or alkylarylsiloxanes in which the alkyl groups have one to five carbon atoms and are entirely or partly fluorinated. Preferred silicones are polydimethylsiloxanes, which optionally can be derivatized and are then aminofunctional or quaternized or have Si—OH, Si—H, and/or Si—Cl bonds. The viscosities of the preferred silicones are in the range between 100 and 100,000 centistokes at 25° C.; the silicones can be used in quantities between 0.2 and 5 wt % based on the entire detergent or agent.

Lastly, the liquid laundry detergents and cleaning agents can also contain UV absorbers, which are absorbed onto the treated textile fabrics and improve the light-fastness of the fibers. Compounds that exhibit these desired properties are, for example, the compounds that act by radiationless deactivation, and derivatives of benzophenone having substituents in the 2- and/or 4-position. Also suitable are substituted benzotriazoles, acrylates phenyl-substituted in the 3-position (cinnamic acid derivatives) optionally having cyano groups in the 2-position, salicylates, organic Ni complexes, and natural substances such as umbelliferone and endogenous urocanic acid.

Substances that complex heavy metals can be used in order to avoid the heavy-metal-catalyzed breakdown of certain laundry-detergent ingredients. Suitable heavy metal complexing agents are, for example, the alkali salts of ethylenediaminetetraacetic acid (EDTA) or of nitrilotriacetic acid (NTA), as well as alkali-metal salts of anionic polyelectrolytes such as polymaleates and polysulfonates.

A preferred class of complexing agents is the phosphonates, which are contained in preferred liquid laundry detergents and cleaning agents in quantities from 0.01 to 25 wt %, by preference 0.02 to 2 wt %, and in particular from 0.03 to 1.5 wt %. These preferred compounds include, in particular, organophosphonates such as, for example, 1-hydroxyethane-1,1-diphosphonic acid (HEDP), aminotri(methylenephosphonic acid) (ATMP), diethylenetriamine penta(methylenephosphonic acid) (DTPMP or DETPMP), and 2-phosphonobutane-1,2,4-tricarboxylic acid (PBS-AM), which are usually used in the form of their ammonium or alkali-metal salts.

The liquid laundry detergents and cleaning agents are manufactured by means of usual and known methods and processes in which, for example, the constituents are simply mixed in agitator vessels; it is useful to prepare water, any nonaqueous solvents that are present, and surfactant(s), and to add the further constituents in portions. Separate heating during manufacture is not necessary; if it is desired, the temperature of the mixture should not exceed 80° C. The capsules can be dispersed in stable fashion into the aqueous liquid laundry detergent and cleaning agent. The detergents or agents are normally stable at room temperature and at 40° C. for a period of at least 4 weeks and preferably at least 6 weeks, with no creaming or sedimenting of the capsules. Preferred detergents or agents have densities from 0.5 to 2.0 g/cm$^3$, in particular 0.7 to 1.5 g/cm$^3$. The difference in density between the capsules and the liquid phase of the detergent or agent is by preference no more than 10% of the density of one of the two, and in particular is so small that the (optionally encased) capsules, and by preference also any other solid particles contained in the detergents or agents, float in the liquid phase.

Other than where otherwise indicated, or where required to distinguish over the prior art, all numbers expressing quantities of ingredients herein are to be understood as modified in all instances by the term "about". As used herein, the words "may" and "may be" are to be interpreted in an open-ended, non-restrictive manner. At minimum, "may" and "may be" are to be interpreted as definitively including, but not limited to, the composition, structure, or act recited.

As used herein, and in particular as used herein to define the elements of the claims that follow, the articles "a" and "an" are synonymous and used interchangeably with "at least one" or "one or more," disclosing or encompassing both the singular and the plural, unless specifically defined herein otherwise. The conjunction "or" is used herein in both in the conjunctive and disjunctive sense, such that phrases or terms conjoined by "or" disclose or encompass each phrase or term alone as well as any combination so conjoined, unless specifically defined herein otherwise.

The description of a group or class of materials as suitable or preferred for a given purpose in connection with the invention implies that mixtures of any two or more of the members of the group or class are equally suitable or preferred. Description of constituents in chemical terms refers unless otherwise indicated, to the constituents at the time of addition to any combination specified in the description, and does not necessarily preclude chemical interactions among the constituents of a mixture once mixed. Steps in any method disclosed or claimed need not be performed in the order recited, except as otherwise specifically disclosed or claimed.

Changes in form and substitution of equivalents are contemplated as circumstances may suggest or render expedient. Although specific terms have been employed herein, such terms are intended in a descriptive sense and not for purposes of limitation.

EXAMPLES

Example 1

Manufacture of a Monodisperse Spherical PAP Granulate (E1)

120 g of a 4% sodium alginate solution (Texamid® 588 P, Cognis Deutschland GmbH) was mixed with 480 g of a PAP dispersion (Eureco® LX, Solvay Solexis). The mixture was then dripped into a 2% calcium nitrate solution using a laboratory metering pump (Watson Marlow 505 Di) through nozzles having a diameter of 1.0 mm, at a flow rate of 1.5 ml/min per nozzle. Monodisperse spheres (E1) having a diameter of approx. 3.5 mm were thereby created. These were removed from the precipitation bath.

Example 2

Manufacture of a Coated Monodisperse Spherical PAP Granulate (E2)

Granulate E1 of Example 1 was firstly surface-dried in an Aeromatic Fielder® laboratory fluidized-bed unit at an inlet air temperature of 60° C. and coated, in the same laboratory fluidized-bed unit that was equipped as a Wurster coater with a heatable injection nozzle, with a coating of paraffin having a thickness of 20% based on the E1 starting material, by spraying paraffin (melting point 57° C.-60° C.) heated to 30° C. above its melting point. The PAP content in the PAP granulate E2 thus obtained was 66 wt %. The particle size of the spheres decreased to 2.0 mm as a result of the drying occurring as the paraffin was applied.

Example 3

Manufacture of a Liquid Laundry Detergent According to the Present Invention

Liquid laundry detergents W1 (containing E1) and W2 (containing E2) of the following compositions were manufactured (all quantities in wt %):

| | |
|---|---|
| 16.5% | LAS (Cognis) |
| 10% | Dehydol ® LT 7 (Cognis) |
| 1% | Sequion 10 H 60 (Polygon Chemie) |
| 3% | sodium citrate |
| 8% | sodium sulfate |
| 3% | PAP granulate E1 or E2 |
| 3.5% | Enzyme granulate (manufactured in accordance with Example 8, granulate E6c of DE 10 2006 018 780) |
| 0.25% | Xanthan Gum TGCS (Jungbunzlauer Xanthan Ges.m.b.H.) |
| 1% | perfume |
| 0.1% | silicone defoamer (Wacker Chemie AG) |
| | water to make 100% |

Manufacture was performed by preparing water and xanthan in an agitator container. After the xanthan had swelled for 30 minutes, the sodium sulfate was added. The surfactants and the further ingredients were then added with agitation. The pH was adjusted to 5.0+/−0.2 using concentrated NaOH.

The shelf stability of the bleaching agent was determined by storing samples of the detergents W1 and W2 for one, two, four, and six weeks at a constant storage temperature of 35° C. The initial PAP concentration, and the concentrations after the corresponding storage times, were determined by iodometric titration at a temperature of 0° C. For comparison, a detergent V1 that had a composition otherwise identical to that of W1 and W2, but that instead of E1 or E2 contained 3 wt % of a commercially obtainable PAP granulate (Eureco® Granulat, Solvay Solexis), was also stored and assayed. The values obtained are summarized in the table below; PAP concentrations are given in % based on the initial value of 100%:

| | Time | | | | |
|---|---|---|---|---|---|
| Sample | 0 weeks | 1 week | 2 weeks | 4 weeks | 6 weeks |
| V1 | 100 | 86.8 | 72.5 | 42.8 | 25.5 |
| W1 | 100 | 97.9 | 92.1 | 76.4 | 66.0 |
| W2 | 100 | 100.0 | 100.0 | 86.4 | 71.0 |

What is claimed is:

1. A method of manufacturing a bleaching agent granule, comprising the steps of:
    forming an aqueous mixture in which a finely particulate bleaching agent, hollow microspheres, and a water-soluble crosslinkable polymer are dispersed;
    adding droplets of the aqueous mixture to an aqueous solution containing a cross-linking agent for the crosslinkable polymer, thereby crosslinking the cross-linkable polymer to form capsules comprising the particulate bleaching agent and the hollow microspheres encapsulated in a matrix of the cross-linked polymer; and
    removing the capsules from the aqueous solution of the crosslinking agent.

2. The method of claim 1, wherein the aqueous mixture comprises 1 to 60 percent by weight of the dispersed finely particulate bleaching agent.

3. The method of claim 1, wherein the particulate bleaching agent is a peroxycarboxylic acid, a diacyl peroxide, or a mixture thereof.

4. The method of claim 3, wherein the peroxycarboxylic acid is an imidoperoxycarboxylic acid.

5. The method of claim 4, wherein the imidoperoxycarboxylic acid is 4-phthalimidoperoxybutanoic acid, 5-phthalimidoperoxypentanoic acid, 6-phthalimidoperoxyhexanoic acid, 7-phthalimidoperoxyheptanoic acid, N,N'-terephthaloyl di-6-aminoperoxyhexanoic acid, or a mixture thereof.

6. The method of claim 3, wherein the diacyl peroxide has a formula of R'—C(O)—O—O—C(O)—R", in which R' and R", mutually independently, each denote an alkyl group having 8 to 20 carbon atoms.

7. The method of claim 6, wherein the diacyl peroxide is di-n-decanoyl peroxide, di-n-undecanoyl peroxide, dilauroyl peroxide, or a mixture thereof.

8. The method of claim 1, wherein the aqueous mixture comprises 0.01 to 5 percent by weight of the water-soluble crosslinkable polymer.

9. The method of claim 1, wherein the water-soluble crosslinkable polymer is an ionotropically crosslinkable polymer.

10. The method of claim 9, wherein the ionotropically crosslinkable polymer is carrageenan, alginate, gellan gum, or a mixture thereof.

11. The method of claim 10, wherein the ionotropically crosslinkable polymer is sodium alginate.

12. The method of claim 1, wherein the aqueous mixture contains a stabilizer for the bleaching agent.

13. The method of claim 1, further comprising encasing the capsules containing the particulate bleaching agent with a paraffin wax.

* * * * *